US009502736B2

(12) United States Patent
Tang et al.

(10) Patent No.: US 9,502,736 B2
(45) Date of Patent: Nov. 22, 2016

(54) CYLINDRICAL SINGLE-PIECE LITHIUM-ION BATTERY OF 400AH AND ITS PREPARATION METHOD

(71) Applicant: Tianjin University, Tianjin (CN)

(72) Inventors: Zhiyuan Tang, Tianjin (CN); Lei Sun, Tianjin (CN); Qi Wang, Tianjin (CN); Guowei Ling, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 14/235,083

(22) PCT Filed: Feb. 22, 2013

(86) PCT No.: PCT/CN2013/071757
§ 371 (c)(1),
(2) Date: Jan. 27, 2014

(87) PCT Pub. No.: WO2014/121528
PCT Pub. Date: Aug. 14, 2014

(65) Prior Publication Data
US 2015/0333364 A1 Nov. 19, 2015

(30) Foreign Application Priority Data

Feb. 7, 2013 (CN) .......................... 2013 1 0048865
Feb. 7, 2013 (CN) .......................... 2013 2 0070958

(51) Int. Cl.
| | | |
|---|---|---|
| H01M 6/16 | (2006.01) | |
| H01M 10/0587 | (2010.01) | |
| H01M 10/0569 | (2010.01) | |
| H01M 4/136 | (2010.01) | |
| H01M 4/131 | (2010.01) | |
| H01M 4/133 | (2010.01) | |
| H01M 10/0525 | (2010.01) | |
| H01M 4/485 | (2010.01) | |
| H01M 4/58 | (2010.01) | |
| H01M 4/62 | (2006.01) | |
| H01M 2/02 | (2006.01) | |
| H01M 2/04 | (2006.01) | |
| H01M 2/12 | (2006.01) | |
| H01M 2/26 | (2006.01) | |
| H01M 2/30 | (2006.01) | |
| H01M 4/66 | (2006.01) | |
| H01M 4/02 | (2006.01) | |

(52) U.S. Cl.
CPC ....... *H01M 10/0587* (2013.01); *H01M 2/0285* (2013.01); *H01M 2/0486* (2013.01); *H01M 2/1241* (2013.01); *H01M 2/263* (2013.01); *H01M 2/30* (2013.01); *H01M 4/131* (2013.01); *H01M 4/133* (2013.01); *H01M 4/136* (2013.01); *H01M 4/485* (2013.01); *H01M 4/5825* (2013.01); *H01M 4/623* (2013.01); *H01M 4/625* (2013.01); *H01M 4/661* (2013.01); *H01M 10/0525* (2013.01); *H01M 10/0569* (2013.01); *H01M 2004/027* (2013.01); *H01M 2004/028* (2013.01); *H01M 2220/10* (2013.01); *H01M 2220/20* (2013.01); *H01M 2300/0028* (2013.01); *Y02E 60/122* (2013.01); *Y10T 29/49115* (2015.01)

(58) Field of Classification Search
CPC ................... H01M 10/0587; H01M 10/0525; H01M 10/0569; H01M 4/131; H01M 4/133; H01M 4/136; H01M 4/485; H01M 4/5825; H01M 4/623; H01M 4/625; H01M 4/661; H01M 2/0285; H01M 2/0486; H01M 2/1241; H01M 2/263; H01M 2/30; H01M 2004/027; H01M 2/028; H01M 2220/10; H01M 2300/0028; Y02E 60/122
See application file for complete search history.

(56) References Cited

U.S. PATENT DOCUMENTS

| | | | | |
|---|---|---|---|---|
| 2010/0261063 | A1* | 10/2010 | Kitagawa | ................ C01B 25/37 429/232 |
| 2011/0189545 | A1* | 8/2011 | Holzapfel | ............ C01G 23/005 429/231.1 |
| 2012/0251891 | A1 | 10/2012 | Li et al. | |
| 2013/0271085 | A1* | 10/2013 | Chen | ................... H01M 4/0445 320/132 |

FOREIGN PATENT DOCUMENTS

| | | |
|---|---|---|
| CN | 1862869 A | 11/2006 |
| CN | 101183731 A | 5/2008 |
| CN | 101262078 A | 9/2008 |
| CN | 101740809 A | 6/2010 |
| CN | 101752611 A | 6/2010 |
| CN | 102299339 A | 12/2011 |
| CN | 102629695 A | 8/2012 |

OTHER PUBLICATIONS

Li, Wencheng, Studies on the manufacture and performance of C-LiFePO4 power battery for electric vehicles, <China Doctoral Thesis Full-text Database Engineering technology II>, Sep. 2011.

* cited by examiner

*Primary Examiner* — Raymond Alejandro
(74) *Attorney, Agent, or Firm* — George G. Wang; Bei & Ocean

(57) ABSTRACT

A cylindrical single-piece lithium-ion battery of 400 Ah includes: a cylindrical battery enclosure (1), a battery mandrel (3), a plurality of tabs (4), a wiring terminal (6), a positive and negative electrode cover (11); a positive electrode sheet, said battery positive electrode is composed of LiFePO$_4$, conductive carbon-black, graphite, adhesive such as PVDF, and solvent such as NMP; a negative electrode sheet, the battery negative electrode is composed of lithium titanate, conductive carbon-black, graphite, adhesive such as PVDF, and solvent such as NMP. The cylindrical lithium-ion battery made by the invention has a capacity of 400 Ah which is the one reportedly having the largest capacity in the world presently.

5 Claims, 5 Drawing Sheets

CYLINDRICAL SINGLE-PIECE LITHIUM-ION BATTERY OF 400AH AND ITS PREPARATION METHOD

CROSS-REFERENCE TO RELATED APPLICATIONS

This application claims priority from PCT Application No. PCT/CN2013/071757, filed Feb. 22, 2013, CN Application No. CN 201310048865.0, filed Feb. 7, 2013, and CN Application No. CN 201320070958.9, filed Feb. 7, 2013, the contents of which are incorporated herein in the entirety by reference.

FIELD OF THE INVENTION

The present invention relates to a lithium-ion battery and more particularly, relates to a cylindrical single-piece lithium-ion battery of 400 Ah and its preparation method thereof.

BACKGROUND OF THE INVENTION

With time coming into 21th century, and with the development of scientific and technology and forthcomingness of information society, especially with the widespread promotion of kinds of mobile communication devices, electronic equipment, office automation products, domestic appliances and medical devices, people have greater demand on energy. At the same time, to alleviate conflict of human being with nature and seek for sustainable development, it has become a rigorous challenge in the 21th century for human to protect nature environment and nature resources. Therefore, it has been a major subject for various countries to develop and exploit new energy and new materials.

Electric energy is very important and indispensable energy for our everyday life and work. Use of any other resources will rely upon electric energy. Also, preservation, conversion and transportation of electric energy all involve battery technique.

In present information era, people have higher and higher requirement for power supply performance, in addition to increased requirement for amount of power supply. The requirement mostly includes high power density, high specific energy, long cyclic lifetime, and large capacity. Also, higher requirement has been imposed to power supply in terms of safety, cost and environment friendship. Conventional battery such as lead acid battery, Ni—Cd battery and Ni-MH battery suffers from drawbacks such as short lifetime, low energy density and environment pollution, thus greatly limiting their use. As lithium-ion battery bears good electrochemical performance, it has become popular new high energy green battery.

Lithium-ion battery is a new type of battery developed from lithium battery. When compared with lithium battery, the most significant advantage of it lies in: material obtained by lithium ion intercalation and de-intercalation may be used to replace lithium, thus resolving problems of lithium anode passivating and dendrite penetration. In addition to maintaining high capacity and high voltage of lithium battery, charging-discharging efficiency and cycle life of it are also improved significantly. Moreover, the safety of battery is also enhanced.

Currently, ordinary material used as anode of lithium-ion battery generally includes layered lithium-intercalated compound $LiMO_2$, spinel-type lithium intercalated compound $LiM_2O_4$, and olivine-type lithium intercalated compound $LiMPO_4$.

$LiCoO_2$ and $LiNiO_2$ is common layered lithium intercalation compound. As anode material, $LiCoO_2$ has high lithium intercalation potential and ideally, its capacity can be up to 274 mAh/g. In actual cycle period however, when hale number of lithium ions is extracted, capacity of the material will be decreased expressly, thus leading to tendency of collapsing of its layered structure. As such, the actual capacity is no more than 150 mAh/g. Furthermore, resource of Cobalt (Co) is rare, expensive, and has certain toxicity. Therefore, some active material with comprehensive electrochemical characteristics, wide availability, and low cost, must be developed to replace Co. Theoretically, $LiNiO_2$ anode material has specific capacity of 275 mAh/g and actually is can get up to 190-210 mAh/g evidently higher than $LiCoO_2$. Accordingly, it is regarded as one of most prospective anode materials for lithium-ion battery following $LiCoO_2$. However, $LiNiO_2$ has some disadvantages limiting its application range, such as rapid decrease in cycle capacity, bad thermal stability and the like.

$LiMn_2O_4$ Anode material is typical representation of spinel-type lithium intercalation compound, and its theoretical capacity is 148 mAh/g, and its actual capacity is about 120 mAh/g. Though $LiMn_2O_4$ has advantages of low cost, non-toxicity, and good safety, it has unstable lattice structure and capacity attenuation in charging-discharging cycle especially under high temperature of 55° C., thus hindering its development and application.

As a most common lithium-ion battery anode material, olivine-type lithium intercalated $LiFePO_4$ has a series of advantages including high theoretical specific capacity (about 170 mAh/g), low cost, good environment friendship, long cycle lifetime, high thermal stability, and safety. Due to these advantages, it has become hot topic to be researched and developed in present battery industry, and has been expected to be a commercialized lithium battery anode material. As a powerful battery, $LiFePO_4$ lithium battery will necessarily become alternative of other types of lithium batteries such as lead acid, Ni-MH and Ni—Cd batteries. Accordingly, $LiFePO_4$ lithium battery has been considered as a mark of new era of lithium-ion battery.

At present, ordinary $LiFePO_4$ lithium battery uses graphite as cathode due to its high specific capacity and low and steady discharging. However, as potential of carbon cathode is close to a standard potential of lithium, in case of battery overcharging, metal lithium may be crystallized on the surface of the carbon electrode and resulting in short circuit. Further, majority electrolyte becomes unsteady under this potential and, the electrolyte is subject to decomposing on the electrode surface and therefore, causes generation of mixture of inflammable gases and presents potential safety problem. In addition, insertion of Li+ into the carbon electrode will result in volume deformation in amount of 10%, causing discontinuity among particles. It further causes loosening and peeling off of the interface between the electrode and electrolyte and between the electrode and current-collector. These factors urge the researchers to make decoration and modification to the present cathode materials and continuously seek for novel lithium-ion battery cathode material with good property, simple manufacture process and low cost. Results of nail test made upon 100 Ah cylindrical $LiFePO_4/C$ lithium-ion battery show that the battery surface temperature can reach 200° C. Apparently, regard to large capacity powerful battery of 100 Ah and above, it is desired to obtain highly safe and steady cathode material.

$Li_4Ti_5O_{12}$ is an ideal intercalation of electrode material. Intercalation and de-intercalation of Li+ has little impact on material structure and therefore, it is called "zero deformation" material. The potential of $Li_4Ti_5O_{12}$ relative to the lithium electrode is 1.55V (relative to Li/Li+), the ideal theoretical capacity is 175 mAh/g, and experimental specific capacity reaches 150-160 mAh/g. It also has good cycle property, long and flat discharging feature, clear voltage rapid change at the end of charging and discharging period, high intercalation lithium potential without crystallization of lithium, capability of being utilized between stable voltage range of most liquid electrolytes, high Coulombic Efficiency (close to 100%), wide source availability, clean and environment friendly feature. Accordingly, it has features required by the next generation of lithium-ion battery such as much more charging repetition times, rapid charging speed and high safety. Comparatively, nail test for 100 Ah cylindrical $LiFePO_4/Li_4Ti_5O_{12}$ lithium-ion battery shows that the battery surface temperature is only 40° C. It is clear that the use of $Li_4Ti_5O_{12}$ as cathode material improves safety of large capacity powerful lithium-ion battery and promotes commercialization of it.

SUMMARY OF THE INVENTIONS

The objection of the present invention is to provide a cylindrical lithium-ion battery with super capacity and a simple preparation method thereof.

A cylindrical single-piece lithium-ion battery of 400 Ah includes:

A cylindrical battery enclosure 1, a battery mandrel 3, a plurality of tabs 4, a wiring terminal 6, a positive and negative electrode cover 11;

Positive electrode sheet: said positive electrode sheet is composed of LiFePO4, conductive carbon-black, graphite, adhesive such as PVDF, and solvent such as NMP in weight % of 42.0-43.0:1.3-1.7:0.8-1.2:2.5-3.5:51.0-53.0. In addition, aluminum foil is used as current-collector;

Negative electrode sheet: the negative electrode sheet is composed of lithium titanate, conductive carbon-black, graphite, adhesive such as PVDF, and solvent such as NMP in weight % of 49.0-50.0:0.8-1.2:0.8-1.2:3.0-4.0:44.0-46.0. In addition, aluminum foil is used as current-collector;

A supporting bracket 5, a sliding ring 7, a tab clamping nut 8, an insulation cushion 9, an O-shaped ring 10, a wiring terminal clamping nut 12 and a locating screw 13.

The aluminum foil has a thickness of 30±2 μm, and width of 320±1 mm. The length of the positive and negative electrode sheets both have a length of 33.81 m.

The tab has a length of 70±1 mm, width of 10±0.1 mm, and thickness of 0.15±0.015 mm.

Three safety valve sheets are provided on each of positive and negative electrode sheets.

Each valve sheet has a diameter of 13 mm, thickness of 0.5 mm, and burst pressure of 7.5-8 kg.

The cylindrical battery enclosure 1 and electrode cover 11 are all made of stainless steel, and have a diameter of 134 mm, length of 450 mm, and wall thickness of 1 mm.

A method of making said cylindrical single-piece lithium-ion battery of 400 Ah is described as follows.

(1) Preparation of Electrodes

Pre-baked crude materials including LiFePO4, conductive carbon black, graphite, adhesive PVDF, and solvent NMP in weight % of 42.0-43.0:1.3-1.7:0.8-1.2:2.5-3.5:51.0-53.0 are evenly mixed together to form battery positive electrode slurry; Pre-baked crude materials including lithium titanate, conductive carbon black, graphite, adhesive PVDF, and solvent NMP in weight % of 49.0-50.0:0.8-1.2:0.8-1.2:3.0-4.0:44.0-46.0 are evenly mixed together to form battery negative electrode slurry;

During coating and rolling process, both of the positive and negative electrodes use aluminum foil as the current-collector. The aluminum foil has a thickness of 30±2 μm, and width of 320±1 mm; the length of both positive and negative electrode sheets is 33.81 m.

(2) Assembly of the Battery

The electrode sheets obtained from above steps are heated for 48 h at a temperature of 100° C.; Then the positive and negative electrode sheets are placed to be aligned with and parallel with a membrane and are loaded into a full automatic winding machine; next, one hundred of aluminum tabs are welded onto an aluminum foil edge of each positive and negative electrode sheets, and high-temperature resistant adhesive paper is employed to secure firmly a root portion of the tabs. Each aluminum tab of positive and negative electrode sheets has a length of 70±1 mm, width of 10±0.1 mm and thickness of 0.15±0.015 mm;

The plurality of evenly divided positive and negative tabs 4 pass through a space defined between the wiring terminal 6 and sliding ring 7, and then are locked by the tab clamping nut 8 (this connection manner is called "wiring collar"); a cell pack is carefully inserted into the enclosure 1; each of two ends of the enclosure 1 is wrapped by a supporting bracket 5; after finishing of the bracket 5, the wiring terminal 6, O-shaped ring 10, insulation cushion 9 and cover 11 are assembled together in sequence and are clamped together by the clamping nut 12 and locating screw 13; three safety valve sheets are provided on each of positive and negative electrode covers. Each valve sheet has a diameter of 13 mm, thickness of 0.5 mm, and burst pressure of 7.5-8 kg; during winding, assembling and welding procedure, a multimeter is used to detect short circuit. When doing so, vacuum injecting means is used to perform electrolyte injection. Said electrolyte may be $LiPF_6$ (EC+PC+DMC+DEC). Finally, a laser welder runs to weld covers to two ends of the battery in a sealing manner.

Compared to prior art, the present invention has the following advantages.

(1) The cylindrical lithium-ion battery made by the invention has a capacity of 400 Ah which is the one reportedly having the largest capacity in the world presently.

(2) The invention utilizes unique matched positive and negative slurry ingredient configuration and leading preparation technology. In the present invention, it is the first time to use $LiFePO_4$ with good thermal stability as positive electrode material, and use "zero deformation" material for example lithium titanate as negative electrode material. The cycle lifetime of the battery is at least 8000 times (and in theory, it can be up to 20000 times). This cycle lifetime is about 2-4 times longer than those lithium-ion batteries in the present marketplace. As such, the safety and cycle lifetime of the battery is improved dramatically.

(3) Nail test applied to the cylindrical lithium-ion battery made by the invention indicates that the battery never burns or bursts. The surface temperature of the battery is only 34° C. Comparatively, nail test applied to a conventional $LiFePO_4/C$ battery seen in the marketplace demonstrates that the surface temperature of the battery is 200° C. Accordingly, the present invention enhances the battery safety.

(4) In the present invention, novel cylindrical configuration is used, which has utility, anti-erosion, pressure resistance, anti-impact, shock resistance, low cost, large electrical capacity and has reasonable internal construction, thus greatly improving heat dissipation, thermal reliability and safety.

(5) Both of positive and negative current-collector use aluminum foils; tabs are made of aluminum material. Compared to current-collector and tabs made of copper in the marketplace, the invention shows significant cost reduction.

(6) In a preferred embodiment, 3 safety valves are installed on both ends of the covers; unique "wiring collar construction" is applied to connect the cell pack and wiring terminals. These designs reduce internal resistance of the battery dramatically and improve safety of the battery.

(7) The invention has simple preparation process and is suitable to industrialized production.

DETAILED DESCRIPTION OF PARTICULAR EMBODIMENTS OF THE INVENTION

Reference is now made to the accompanying drawings in which is shown an illustrative embodiment of the present invention from which its features and advantages will be apparent.

Embodiment 1

Pre-baked crude materials including $LiFePO_4$, conductive carbon black, graphite, adhesive PVDF, and solvent NMP in weight % of 42.0-43.0:1.3-1.7:0.8-1.2:2.5-3.5:51.0-53.0 and in total weight of 7.279 kg are evenly mixed together to form battery positive electrode slurry;

Pre-baked crude materials including lithium titanate, conductive carbon black, graphite, adhesive PVDF, and solvent NMP in weight % of 49.0-50.0:0.8-1.2:0.8-1.2:3.0-4.0:44.0-46.0 and in total weight of 6.656 kg are evenly mixed together to form battery negative electrode slurry.

During coating and rolling process, both of the positive and negative electrodes use aluminum foil as the current-collector. The aluminum foil has a thickness of 30±2 µm, and width of 320±1 mm; the length of both positive and negative electrode sheets is 33.81 m.

The electrode sheets obtained from above steps are heated for 48 h at a temperature of 100° C.; Then the positive and negative electrode sheets are placed to be aligned with and parallel with a membrane and are loaded into a full automatic winding machine; next, one hundred of aluminum tabs are welded onto an aluminum foil edge of each positive and negative electrode sheets, and high-temperature resistant adhesive paper is employed to secure firmly a root portion of the tabs. Each aluminum tab of positive and negative electrode sheets has a length of 70±1 mm, width of 10±0.1 mm and thickness of 0.15±0.015 mm.

Figure 1:
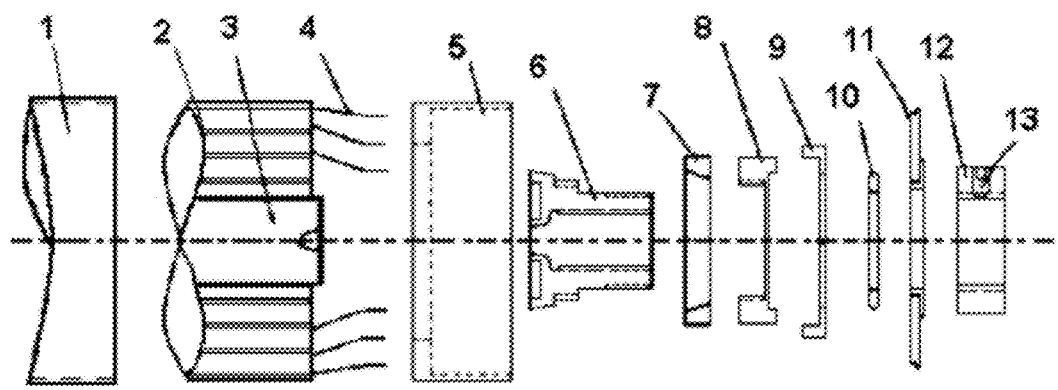
FIG. 1 is a cross-sectional view showing assembling of a cylindrical single-piece $LiFePO_4/Li_4Ti_5O_{12}$ lithium-ion battery of 400 Ah made according to a first embodiment. In this figure, 1 is cylindrical battery enclosure 1, 2 is battery winding core, 3 is battery mandrel, 4 is tab, 5 is supporting bracket, 6 is wiring terminal, 7 is sliding ring, 8 is clamping nut, 9 is insulation cushion, 10 is O-shaped ring, 11 is positive and negative cover, 12 is wiring terminal clamping nut, and 13 is locating pin.

The plurality of evenly divided positive and negative tabs 4 pass through a space defined between the wiring terminal 6 and sliding ring 7, and then are locked by the tab clamping nut 8 (this connection manner is called "wiring collar"); a cell pack is carefully inserted into the enclosure 1; each of two ends of the enclosure 1 is wrapped by a supporting bracket 5; after finishing of the bracket 5, the wiring terminal 6, O-shaped ring 10, insulation cushion 9 and cover 11 are assembled together in sequence and are clamped together by the clamping nut 12 and locating screw 13 (See for FIG. 1); three safety valve sheets are provided on each of positive and negative electrode covers. Each valve sheet has a diameter of 13 mm, thickness of 0.5 mm, and burst pressure of 7.5-8 kg; during winding, assembling and welding procedure, a multimeter is used to detect short circuit. When doing so, vacuum injecting means is used to perform electrolyte injection. Said electrolyte may be $LiPF_6$ (EC+PC+DMC+DEC). Finally, a laser welder runs to weld covers to two ends of the battery in a sealing manner.

Various parameters are listed below:

Battery enclosure: made of stainless steel, diameter: 134 mm, length: 450 mm, weight: 12 Kg; rated capacity: 400 Ah; rated working voltage: 1.8V; internal resistance: 0.33 mΩ; cycle lifetime: more than 8000 times.

Figure 2:
FIG. 2 is a photo of a cylindrical single-piece $LiFePO_4/Li_4Ti_5O_{12}$ lithium-ion battery of 400 Ah made in the first embodiment.
Figure 3:
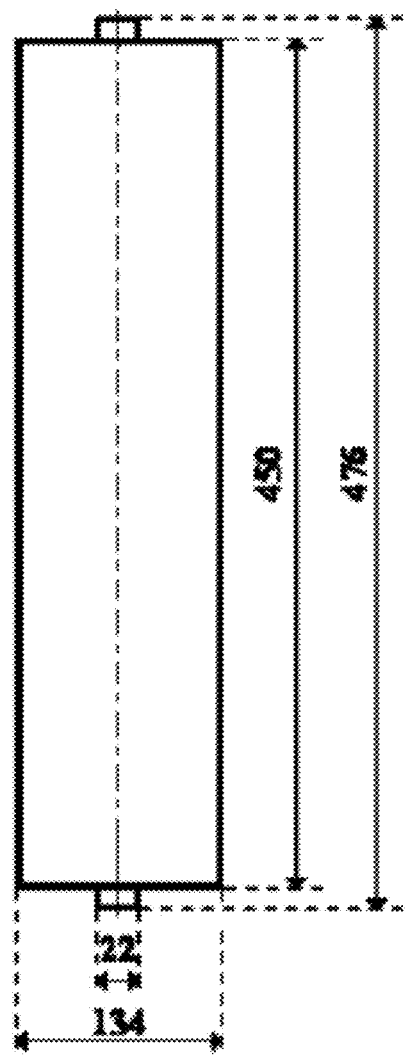
FIG. 3 shows design sizes in mm of a cylindrical single-piece $LiFePO_4/Li_4Ti_5O_{12}$ lithium-ion battery of 400 Ah made in the first embodiment.

Photos of the cylindrical single-piece $LiFePO_4/Li_4Ti_5O_{12}$ lithium-ion battery of 400 Ah made in the first embodiment are shown in FIG. 2, and its contour sizes are indicated in FIG. 3.

The cylindrical single-piece $LiFePO_4/Li_4Ti_5O_{12}$ lithium-ion battery of 400 Ah made in the first embodiment is tested by charging-discharging with constant current using battery test equipment such as model BTS-5V200A produced by Shenzhen New Wale electronic products INC. The above test is conducted according to "Electric automobile lithium-ion battery" set forth in Chinese automobile industry standard QC/T743-2006. During charging period, current is at first kept constant and then voltage is kept constant. The charging restriction voltage is 2.3V. During discharging period, current is constant, and discharging cutoff voltage is 0.5V. Current with magnitude of 0.33 C is used to perform the above test.

The cylindrical single-piece $LiFePO_4/Li_4Ti_5O_{12}$ lithium-ion battery of 400 Ah made in the first embodiment has a weight of 12 kg, discharging capacity of 417.718 Ah, charging-discharging efficiency of 99.6%, internal resistance of 0.33 mΩ, and cycle lifetime of at least 8000 times (in theory, it can be 20000 times).

Figure 4:
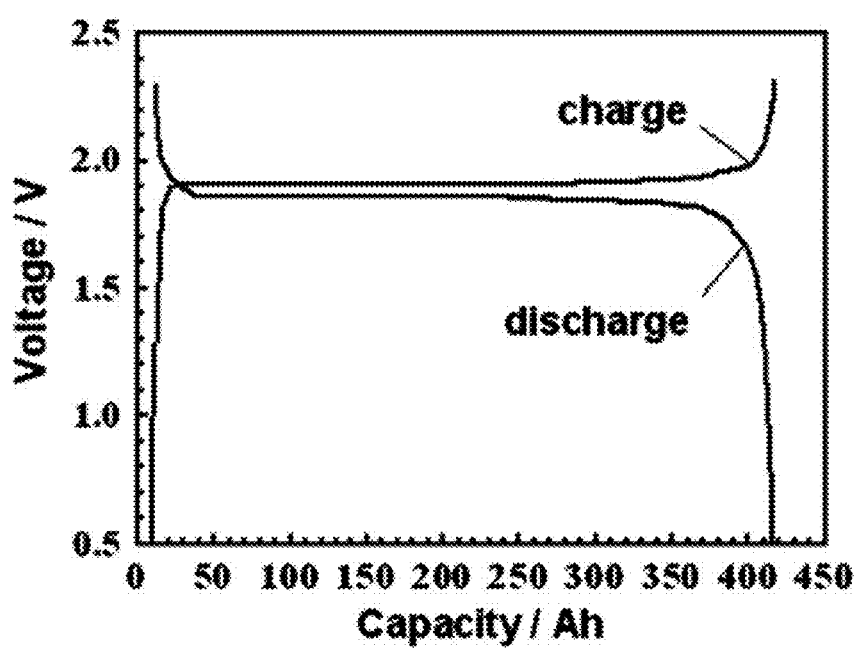
FIG. 4 is a charging-discharging curve of a cylindrical single-piece $LiFePO_4/Li_4Ti_5O_{12}$ lithium-ion battery of 400 Ah made in the first embodiment, wherein the x-axis denotes capacity in unit of Ah, while the Y-axis denotes voltage in unit of volt.

It is clear from FIG. 4 that the battery has stable charging-discharging voltage, long holding time of potential (capacity may be 95% of the discharging capacity), these being brought by reaction between Spinel-type $Li_4Ti_5O_{12}$ and Rock Salt-type $Li_7Ti_5O_{12}$. Reaction of the two substance makes the electrode potential stable. When above reaction is finished substantially, the potential will rapidly rise or drop. When charging and discharging ends, the resulting significant voltage steep change may be used to indicate termination of charging and discharging, thereby facilitating detection of the battery capacity.

The cylindrical single-piece $LiFePO_4/Li_4Ti_5O_{12}$ lithium-ion battery of 400 Ah made in the first embodiment has an internal resistance of only 0.33 mΩ meaning very good conductivity. The battery electrode sheet of large capacity also has great cross-section area and therefore, the internal resistance of the battery is very small (the resistance is in reverse proportion to the cross-section area). Compared with the battery prepared using laminated sheets, during winding process of the battery electrode sheet, the positive and negative electrode sheets of the battery prepared by using this technique will be pressed tightly against the membrane under the tension. Accordingly, the winding core is robust and has large cross section area. Therefore, the battery has very small internal resistance.

In test range of the first embodiment, the capacity of the cylindrical single-piece $LiFePO_4/Li_4Ti_5O_{12}$ lithium-ion battery is not seen attenuated. It is predicted based on feature of $Li_4Ti_5O_{12}$ and previous data of battery with small capacity that the cylindrical single-piece $LiFePO_4/Li_4Ti_5O_{12}$ lithium-ion battery of 400 Ah will have a cycle lifetime of at least 8000 times (in theory, it can be 20000 times). This cycle lifetime is about 2-4 times longer than those lithium-ion batteries in the marketplace.

The internal resistance, cycle lifetime and other major technical parameters of the cylindrical single-piece $LiFePO_4/Li_4Ti_5O_{12}$ lithium-ion battery of 400 Ah made in the first embodiment have met expected design requirements.

Figure 5:
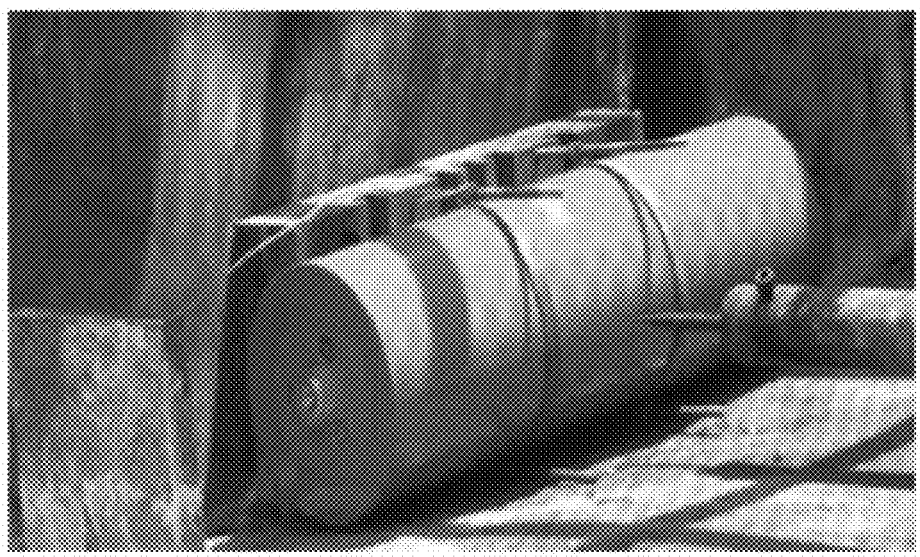
FIG. 5 shows a photo of a cylindrical single-piece $LiFePO_4/Li_4Ti_5O_{12}$ lithium-ion battery of 400 Ah made in the first embodiment before application of a nail test.
Figure 6:
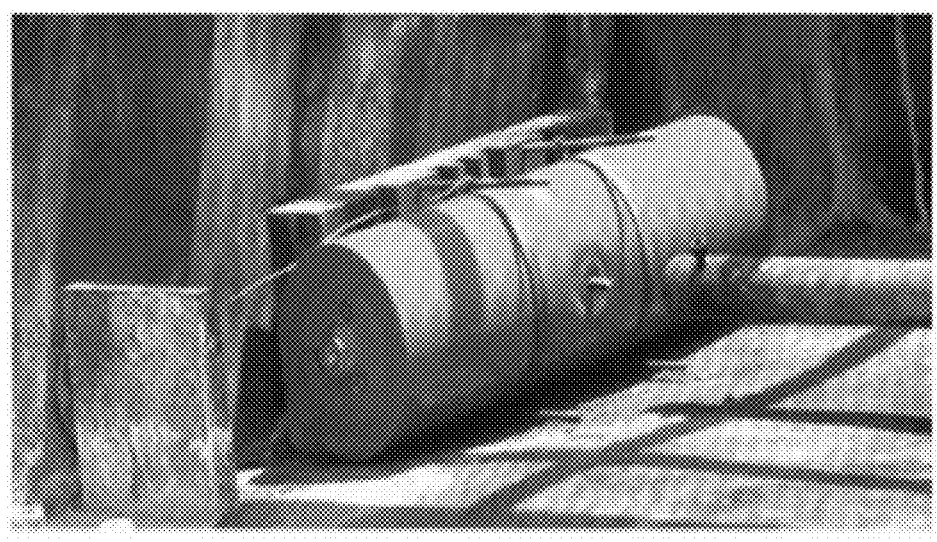
FIG. 6 shows a photo of a cylindrical single-piece $LiFePO_4/Li_4Ti_5O_{12}$ lithium-ion battery of 400 Ah made in the first embodiment after application of a nail test.

The cylindrical single-piece $LiFePO_4/Li_4Ti_5O_{12}$ lithium-ion battery of 400 Ah made in the first embodiment is tested by charging-discharging with constant current using battery test equipment such as model BTS-5V200A produced by Shenzhen New Wale electronic products INC.. The above test is conducted according to "Electric automobile lithium-ion battery" set forth in Chinese automobile industry standard QC/T743-2006. Neither burning nor burst has occurred when applying the nail test. In addition, 6 safety valves mounted on both covers located at two ends of the battery are not opened at all (See FIG. 5). The surface temperature of the battery is only 34° C. Comparatively, nail test applied to a conventional $LiFePO_4/C$ battery seen in the marketplace demonstrates that the surface temperature of the battery is 200° C. Apparently, the safety of the battery is significantly improved.

COMPARATIVE EXAMPLE 1

Pre-baked crude materials including $LiFePO_4$, conductive carbon black, graphite, adhesive PVDF, and solvent NMP in weight % of 38.0-39.0:0.8-1.2:0.3-0.7:2.5-3.5:56.0-58.0 and in total weight of 2.672 kg are evenly mixed together to form battery positive electrode slurry.

Pre-baked crude materials including artificial graphite, conductive carbon black, adhesive PVDF, and solvent NMP in weight % of 36.0-37.0:0.8-1.2:3.0-4.0:58.0-60.0 and in total weight of 1.192 kg are evenly mixed together to form battery negative electrode slurry.

During coating and rolling process, the positive electrode uses aluminum foil as the current-collector, while the negative electrode uses copper foil as its current-collector. The aluminum foil has a thickness of 30±2 μm, and width of 320±1 mm; and the copper foil has a thickness of 22±2 μm, and width of 320±1 mm. The length of both positive and negative electrode sheets is 11.00 m.

The electrode sheets obtained from above steps are heated for 48 h at a temperature of 100° C.; Then the positive and negative electrode sheets are placed to be aligned with and parallel with a membrane and are loaded into a full automatic winding machine; next, 73 aluminum tabs are welded onto a foil edge of the positive electrode sheet, and 73 copper tabs are welded onto a foil edge of the negative electrode sheet. The aluminum tab of positive electrode sheet has a length of 70±1 mm, width of 10±0.1 mm and thickness of 0.1±0.01 mm. The copper tab of negative electrode sheet has a length of 70±1 mm, width of 10±0.05 mm and thickness of 0.05±0.01 mm.

The positive and negative tabs are secured onto the corresponding wiring terminals using tab bolts and tab plates. The tabs should be clamped tightly. A cell pack is carefully inserted into a battery casing; each of two ends of the casing is wrapped by a supporting bracket; after finishing of the bracket, the positive and negative wiring terminals, internal insulation rings, O-shaped ring, cover, external insulation ring, and wiring terminal anti-loosening cushion are assembled together in sequence and are clamped together by the clamping nut; a safety valve sheet is provided on each of positive and negative electrode covers. Each valve sheet has a diameter of 13 mm, thickness of 0.5 mm, and burst pressure of 7.5-8 kg; during winding, assembling and welding procedure, a multimeter is used to detect short circuit. When doing so, vacuum injecting means is used to perform electrolyte injection. Said electrolyte may be $LiPF_6$ (EC+PC+DMC+DEC). Finally, a laser welder runs to weld covers to two ends of the battery in a sealing manner.

The cylindrical $LiFePO_4/C$(artificial graphite) lithium-ion battery of 100 Ah made in the comparative example 1 is tested by charging-discharging with constant current using battery test equipment such as model BTS-5V200A produced by Shenzhen New Wale electronic products INC.. The above test is conducted according to "Electric automobile lithium-ion battery" set forth in Chinese automobile industry standard QC/T743-2006. During charging period, current is at first kept constant and then voltage is kept constant. The charging restriction voltage is 2.0V. During discharging period, current is constant, and discharging cutoff voltage is 2.0V. Current with magnitude of 0.33 C is used to perform the above test.

The cylindrical $LiFePO_4/C$(artificial graphite) lithium-ion battery of 100 Ah made in the comparative example 1 has a weight of 3.7 kg, discharging capacity of 102.245 Ah, charging-discharging efficiency of 93.9%, internal resistance of 0.60 mΩ, and cycle lifetime of about 3000 times.

The nail test is conducted according to "Electric automobile lithium-ion battery" set forth in Chinese automobile industry standard QC/T743-2006 to the cylindrical $LiFePO_4/C$ (artificial graphite) lithium-ion battery of 100 Ah made in the comparative example 1. Neither burning nor burst has occurred. In addition, one of two safety valves mounted on both covers located at two ends of the battery is opened. The surface temperature of the battery is 200° C.

COMPARATIVE EXAMPLE 2

Pre-baked crude materials including $LiFePO_4$, conductive carbon black, graphite, adhesive PVDF, and solvent NMP in weight % of 38.0-39.0:0.8-1.2:0.3-0.7:2.5-3.5:56.0-58.0 and in total weight of 2.672 kg are evenly mixed together to form battery positive electrode slurry.

Pre-baked crude materials including carbon fiber ball, conductive carbon black, adhesive PVDF, and solvent NMP in weight % of 36.0-37.0:0.8-1.2:3.0-4.0:58.0-60.0 and in total weight of 1.192 kg are evenly mixed together to form battery negative electrode slurry.

During coating and rolling process, the positive electrode uses aluminum foil as the current-collector, while the negative electrode uses copper foil as its current-collector. The aluminum foil has a thickness of 30±2 μm, and width of 320±1 mm; and the copper foil has a thickness of 22±2 μm, and width of 320±1 mm. The length of both positive and negative electrode sheets is 11.00 m.

The electrode sheets obtained from above steps are heated for 48 h at a temperature of 100° C.; Then the positive and negative electrode sheets are placed to be aligned with and parallel with a membrane and are loaded into a full automatic winding machine; next, 73 aluminum tabs are welded onto a foil edge of the positive electrode sheet, and 73 copper tabs are welded onto a foil edge of the negative electrode sheet. In addition, high-temperature resistant adhesive paper is used to attach the tabs tightly. The aluminum tab of positive electrode sheet has a length of 70±1 mm, width of 10±0.1 mm and thickness of 0.1±0.01 mm. The copper tab of negative electrode sheet has a length of 70±1 mm, width of 10±0.05 mm and thickness of 0.05±0.01 mm.

The positive and negative tabs are secured onto the corresponding wiring terminals using tab bolts and tab plates. The tabs should be clamped tightly. A cell pack is carefully inserted into a battery casing; each of two ends of the casing is wrapped by a supporting bracket; after finishing of the bracket, the positive and negative wiring terminals, internal insulation rings, O-shaped ring, cover, external insulation ring, and wiring terminal anti-loosening cushion are assembled together in sequence and are clamped together by the clamping nut; a safety valve sheet is provided on each of positive and negative electrode covers. Each valve sheet has a diameter of 13 mm, thickness of 0.5 mm, and burst pressure of 7.5-8 kg; during winding, assembling and welding procedure, a multimeter is used to detect short circuit. When doing so, vacuum injecting means is used to perform electrolyte injection. Said electrolyte may be $LiPF_6$ (EC+PC+DMC+DEC). Finally, a laser welder runs to weld covers to two ends of the battery in a sealing manner.

The cylindrical $LiFePO_4$/C(carbon fiber ball) lithium-ion battery of 100 Ah made in the comparative example 2 is tested by charging-discharging with constant current using battery test equipment such as model BTS-5V200A produced by Shenzhen New Wale electronic products INC. The above test is conducted according to "Electric automobile lithium-ion battery" set forth in Chinese automobile industry standard QC/T743-2006. During charging period, current is at first kept constant and then voltage is kept constant. The charging restriction voltage is 3.8V. During discharging period, current is constant, and discharging cutoff voltage is 2.0V. Current with magnitude of 0.33 C is used to perform the above test.

The cylindrical $LiFePO_4$/C(carbon fiber ball) lithium-ion battery of 100 Ah made in the comparative example 2 has a weight of 3.7 kg, discharging capacity of 104.662 Ah, charging-discharging efficiency of 95.2%, internal resistance of 0.50 mΩ, and cycle lifetime of about 3000 times.

The nail test is conducted according to "Electric automobile lithium-ion battery" set forth in Chinese automobile industry standard QC/T743-2006 to the cylindrical $LiFePO_4$/C(carbon fiber ball) lithium-ion battery of 100 Ah made in the comparative example 2. Neither burning nor burst has occurred. In addition, neither of two safety valves mounted on both covers located at two ends of the battery is opened. The surface temperature of the battery is 180° C.

COMPARATIVE EXAMPLE 3

Pre-baked crude materials including $LiCoO_2$, conductive carbon black, graphite, adhesive PVDF, and solvent NMP in weight % of 39.0-40.0:0.3-0.7:0.8-1.2:1.5-2.5:56.0-58.0 and in total weight of 0.467 kg are evenly mixed together to form battery positive electrode slurry.

Pre-baked crude materials including graphite, conductive carbon black, adhesive PVDF, and solvent NMP in weight % of 37.0-38.0:0.8-1.2:2.0-3.0:58.0-60.0 and in total weight of 0.261 kg are evenly mixed together to form battery negative electrode slurry.

During coating and rolling process, the positive electrode uses aluminum foil as the current-collector, while the negative electrode uses copper foil as its current-collector. The aluminum foil has a thickness of 20±2 μm, and width of 183±1 mm; and the copper foil has a thickness of 12±2 μm, and width of 183±1 mm. The length of both positive and negative electrode sheets is 2.13 m.

The electrode sheets obtained from above steps are heated for 48 h at a temperature of 100° C.; Then the positive and negative electrode sheets are placed to be aligned with and parallel with a membrane and are loaded into a full automatic winding machine; next, 6 aluminum tabs are welded onto a foil edge of the positive electrode sheet, and 6 Ni tabs are welded onto a foil edge of the negative electrode sheet. In addition, high-temperature resistant adhesive paper is used to attach the tabs tightly. The aluminum tab of positive electrode sheet has a length of 70±1 mm, width of 10±0.1 mm and thickness of 0.1±0.01 mm. The Ni tab of negative electrode sheet has a length of 70±1 mm, width of 10±0.05 mm and thickness of 0.1±0.01 mm.

The positive tab passes through a hole defined in the insulation sheet and then is wrapped with the supporting bracket. Finally, it is welded directly on the inner side of the positive electrode cover (tablet cover). Next, a cell pack is carefully inserted into a battery enclosure. After that, the negative tab passes through a hole defined in the insulation sheet and then is welded to the positive tab and finally is wrapped with the supporting bracket. The O-shaped ring, negative cover, and negative wiring terminal are assembled together tightly in sequence; a safety valve sheet is provided on the negative electrode cover. The valve sheet has a diameter of 13 mm, thickness of 0.5 mm, and burst pressure of 7.5-8 kg; during winding, assembling and welding procedure, a multimeter is used to detect short circuit. When doing so, vacuum injecting means is used to perform electrolyte injection. Said electrolyte may be $LiPF_6$ (EC+PC+DMC+DEC). Finally, a laser welder runs to weld covers to two ends of the battery in a sealing manner.

The cylindrical $LiCoO_2$/C lithium-ion battery of 20 Ah made in the comparative example 3 is tested by charging-discharging with constant current using battery test equipment such as model BTS-5V200A produced by Shenzhen New Wale electronic products INC. The above test is conducted according to "Electric automobile lithium-ion battery" set forth in Chinese automobile industry standard QC/T743-2006. During charging period, current is at first kept constant and then voltage is kept constant. The charging restriction voltage is 4.2V. During discharging period, current is constant, and discharging cutoff voltage is 3.0V. Current with magnitude of 0.33 C is used to perform the above test.

The cylindrical $LiCoO_2$/Clithium-ion battery of 20 Ah made in the comparative example 3 has a weight of 0.58 kg, discharging capacity of 20.392 Ah, charging-discharging efficiency of 87.1%, internal resistance of 4.77 mΩ, and cycle lifetime of about 2500 times.

Figure 7:
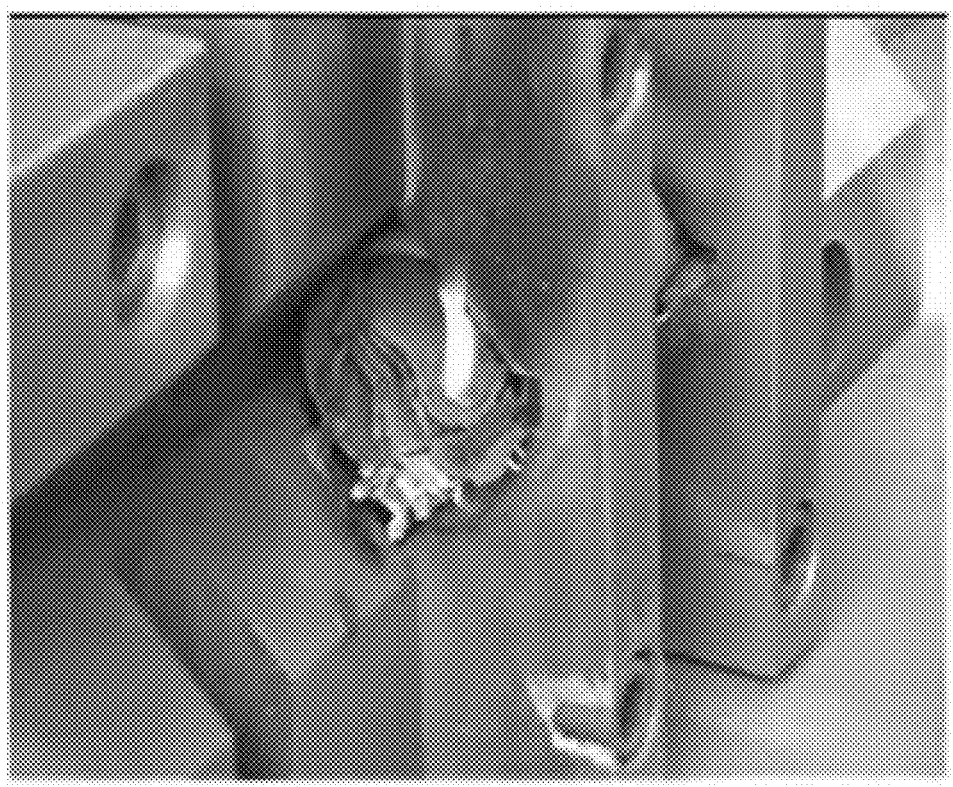
FIG. 7 shows a photo illustrating burning and explosion of 20 Ah $LiCoO_2/C$ lithium-ion battery after application of nail test.

The nail test is conducted according to "Electric automobile lithium-ion battery" set forth in Chinese automobile industry standard QC/T743-2006 to the cylindrical $LiCoO_2$/C lithium-ion battery of 20 Ah made in the comparative example 3. The cover of the negative electrode and the safety valve sheet thereon are both opened. Burning and burst occur to the battery, as shown in FIG. 7.

COMPARATIVE EXAMPLE 4

Pre-baked crude materials including $LiFePO_4$, conductive carbon black, graphite, adhesive PVDF, and solvent NMP in weight % of 42.0-43.0:1.3-1.7:0.8-1.2:2.5-3.5:51.0-53.0 and in total weight of 3.795 are evenly mixed together to form battery positive electrode slurry.

Pre-baked crude materials including lithium titanate, conductive carbon black, graphite, adhesive PVDF, and solvent NMP in weight % of 49.0-50.0:0.8-1.2:0.8-1.2:3.0-4.0:44.0-46.0 and in total weight of 3.472 kg are evenly mixed together to form battery negative electrode slurry.

During coating and rolling process, both of the positive and negative electrodes use aluminum foil as the current-collector. The aluminum foil has a thickness of 30±2 μm, and width of 320±1 mm; the length of both positive and negative electrode sheets is 17.63 m.

The electrode sheets obtained from above steps are heated for 48 h at a temperature of 100° C.; Then the positive and negative electrode sheets are placed to be aligned with and parallel with a membrane and are loaded into a full automatic winding machine; next, 60 aluminum tabs are welded onto an aluminum foil edge of each positive and negative electrode sheets, and high-temperature resistant adhesive paper is employed to secure firmly a root portion of the tabs. Each aluminum tab of positive and negative electrode sheets has a length of 70±1 mm, width of 10±0.1 mm and thickness of 0.15±0.015 mm.

The plurality of evenly-divided positive and negative tabs pass through a space defined between the wiring terminal and sliding ring, and then are locked by the tab clamping nut (this connection manner is called "wiring collar"); a cell pack is carefully inserted into the enclosure; each of two ends of the enclosure is wrapped by a supporting bracket; after finishing of the bracket, the positive and negative wiring terminals, O-shaped ring, insulation cushion and cover are assembled together in sequence and are clamped together by the clamping nut and locating screw; two safety valve sheets are provided on each of positive and negative electrode sheets. Each valve sheet has a diameter of 13 mm, thickness of 0.5 mm, and burst pressure of 7.5-8 kg; during winding, assembling and welding procedure, a multimeter is used to detect short circuit. When doing so, vacuum injecting means is used to perform electrolyte injection. Said electrolyte may be $LiPF_6$ (EC+PC+DMC+DEC). Finally, a laser welder runs to weld covers to two ends of the battery in a sealing manner.

The cylindrical $LiFePO_4/Li_4Ti_5O_{12}$ lithium-ion battery of 200 Ah made in the example 4 is tested by charging-discharging with constant current using battery test equipment such as model BTS-5V200A produced by Shenzhen New Wale electronic products INC.. The above test is conducted according to "Electric automobile lithium-ion battery" set forth in Chinese automobile industry standard QC/T743-2006. During charging period, current is at first kept constant and then voltage is kept constant. The charging restriction voltage is 2.3V. During discharging period, current is constant, and discharging cutoff voltage is 0.5V. Current with magnitude of 0.33 C is used to perform the above test.

The cylindrical $LiFePO_4/Li_4Ti_5O_{12}$ lithium-ion battery of 200 Ah made in the example 4 has a weight of 7 kg, discharging capacity of 204.754 Ah, charging-discharging efficiency of 98.9%, internal resistance of 0.47 mΩ, and cycle lifetime of at least 8000 times (in theory, it can be 20000 times).

The cylindrical $LiFePO_4/Li_4Ti_5O_{12}$ lithium-ion battery of 200 Ah made in the example 4 is tested by charging-discharging with constant current using battery test equipment such as model BTS-5V200A produced by Shenzhen New Wale electronic products INC. The above test is conducted according to "Electric automobile lithium-ion battery" set forth in Chinese automobile industry standard QC/T743-2006. Neither burning nor burst has occurred during the nail test. In addition, 4 safety valves mounted on both covers located at two ends of the battery are not opened at all. The surface temperature of the battery is 34° C.

In a summary, the cylindrical $LiFePO_4/Li_4Ti_5O_{12}$ lithium-ion battery made by the first embodiment of the invention has large capacity, small internal resistance, long cycle lifetime, good safety reliability, strong environment adaptation, good uniformity and accordingly, it can be applied widely to electric automobile, hybrid power automobile, military equipment, aerospace, hydraulic power, thermal power, wind power, polar power station system and uninterrupted power supply for post telecommunications, thus meeting increasing marketplace requirements, and having wide prospect.

It is the definite choice for developing and utilizing green energy. The cylindrical lithium-ion battery with high capacity, large power and good safety will find its great application and prospect throughout the world.

What is claimed is:

1. A cylindrical single-piece lithium-ion battery of 400 Ah comprising:
    a cylindrical battery enclosure, a battery mandrel, a plurality of tabs, a wiring terminal, a positive electrode cover and a negative electrode cover;
    a positive electrode sheet comprising by weight 42.0%-43.0% LiFePO4, 1.3%-1.7% conductive carbon-black, 0.8%-1.2% graphite, 2.5%-3.5% polyvinylidene difluoride as adhesive, and 51.0%-53.0% N-Methyl-2-pyrrolidone as solvent and further comprising aluminum as a first current collector;
    a negative electrode sheet comprising by weight 49.0%-50.0% lithium titanate, 0.8%-1.2% conductive carbon-black, 0.8%-1.2% graphite, 3.0%-4.0% polyvinylidene difluoride as adhesive and 44.0%-46.0% N-Methyl-2-pyrrolidone as solvent and further comprising aluminum as a second current collector; and
    a supporting bracket, a sliding ring, a tab clamping nut, an insulation cushion, an O-shaped ring, a wiring terminal clamping nut and a locating screw.

2. The cylindrical single-piece lithium-ion battery of 400 Ah according to claim 1, wherein both the aluminum foil as the first current collector and the second collector have a thickness of 30±2 μm and a width of 320±1 mm; and the positive and negative electrode sheets both have a length of 33.81 m.

3. The cylindrical single-piece lithium-ion battery of 400 Ah according to claim 1, wherein the plurality of tabs each have a length of 70±1 mm, a width of 10±0.1 mm, and a thickness of 0.15±0.015 mm.

4. The cylindrical single-piece lithium-ion battery of 400 Ah according to claim 3, wherein three safety valve sheets are provided on each of the positive electrode sheet and the negative electrode sheet; and each said valve sheet has a diameter of 13 mm, a thickness of 0.5 mm, and a burst pressure of 7.5-8 kg.

5. The cylindrical single-piece lithium-ion battery of 400 Ah according to claim 4, wherein the cylindrical battery enclosure and electrode cover are all made of stainless steel, and have a diameter of 134 mm, a length of 450 mm, and a wall thickness of 1 mm.

* * * * *